Figure 1:
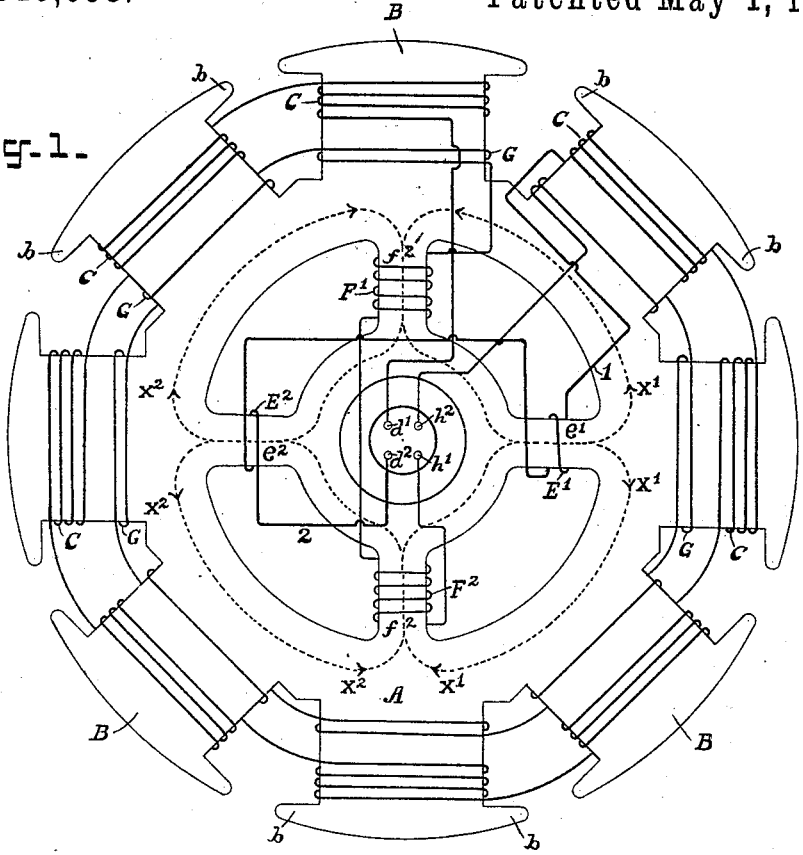

(No Model.)

A. SCHMID & B. G. LAMME.
SELF EXCITING CONSTANT POTENTIAL ELECTRIC GENERATOR.

No. 519,098. Patented May 1, 1894.

Witnesses
James W. Smith
Edward W. Keally

Albert Schmid
Benjamin G. Lamme
Inventors

By their Attorney
Charles A. Terry

UNITED STATES PATENT OFFICE.

ALBERT SCHMID, OF ALLEGHENY, AND BENJAMIN G. LAMME, OF PITTSBURG, ASSIGNORS, BY MESNE ASSIGNMENTS, TO THE WESTINGHOUSE ELECTRIC AND MANUFACTURING COMPANY, OF PITTSBURG, PENNSYLVANIA.

SELF-EXCITING CONSTANT-POTENTIAL ELECTRIC GENERATOR.

SPECIFICATION forming part of Letters Patent No. 519,098, dated May 1, 1894.

Application filed February 20, 1890. Serial No. 341,169. (No model.)

*To all whom it may concern:*

Be it known that we, ALBERT SCHMID, a citizen of the Republic of Switzerland, residing at Allegheny, and BENJAMIN G. LAMME, a citizen of the United States, residing at Pittsburg, in the county of Allegheny, State of Pennsylvania, have invented certain new and useful Improvements in Self-Exciting Constant-Potential Electric Generators, (Case No. 388,) of which the following is a specification.

The invention relates to a method of and apparatus for generating alternating electric currents of constant potential.

The purpose of the invention is to provide means for maintaining the field of force of an alternating current electric generator and insuring that the current delivered shall be of constant difference of potential throughout variations in the amount of work being done in the work circuit of the machine.

The invention may be generally described as follows: An armature is constructed with main work-circuit coils and with supplemental field exciting coils. These supplemental coils are connected with the field magnet coils through a commutator. Regulating coils are connected in series with the exciting coils and these regulating coils are wound upon cores which, for convenience of construction may constitute a portion of the support of the armature. Other regulating coils are connected in series with the main work-circuit coils. These latter coils are wound upon cores whose magnetic circuits are completed through the cores of the first named regulating coils.

The method of operation is substantially this: When a given load is upon the work-circuit, currents flowing thereto traverse the regulating coils of the work-circuit and generate lines of force which complete their magnetic circuit through the regulating coils connected in series with the exciting coils and thus augment the electromotive force developed in these latter coils. If now there is an increase in the amount of work being done in the work-circuit, more current is delivered to the work-circuit; this results in a greater number of ampère-turns in the main armature coils, and these in turn check the flow of the lines of magnetic force from the field-magnet through the armature cores. A corresponding diminution in the electromotive force of the main current and also of the exciting current would thus be occasioned, but the increase of current flowing to the work-circuit generates a greater number of lines of magnetic force in the cores surrounded by the regulating coils and these lines of force traversing the regulating coils of the exciting circuit still further augment the electromotive force of the latter circuit, thus increasing the field excitation and causing a corresponding increase in the number of lines of force caused to traverse the armature core and thread the main work-circuit coils. In this manner the tendency to a decrease of electromotive force upon the work circuit occasioned by the greater flow of current through the armature coils and the corresponding increase in the number of opposing lines of magnetic force developed in the armature core and opposing the passage of the field lines of force through the work-circuit and the exciting coils, will be compensated by a corresponding increase in the strength of the field-magnet.

The invention will be further described in connection with the accompanying drawings, in which—

Figure 2:
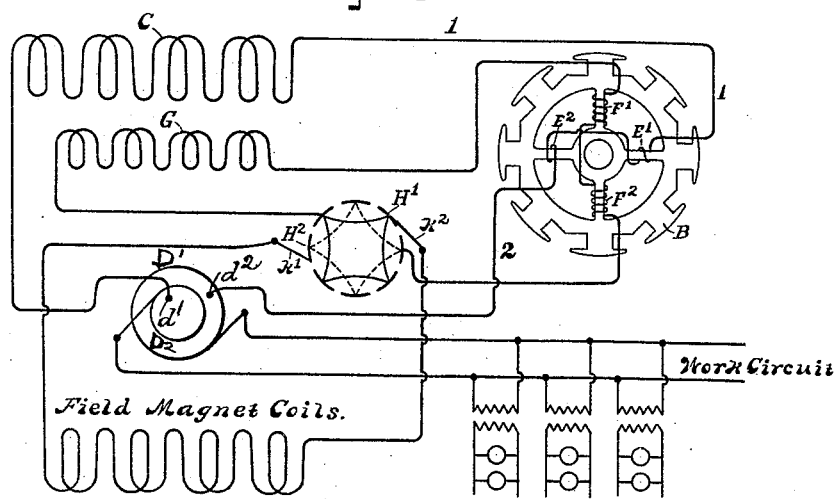

Figure 1 is a diagram showing the general construction and arrangement of the circuits of the armature and Fig. 2 is a diagram showing more in detail the relation of the circuits.

Referring to the figures, A represents an armature core, in this instance constructed with radiating pole pieces, B, provided with overhanging projections or lugs $b$. The armature is wound with the main work-circuit coils C having their terminals $d'$, $d^2$ connected with the collector rings $D'$, $D^2$, respectively. The coils are shown as wound about the respective poles in succession, the direction of winding being reversed upon alternate poles. The terminal $d'$ is shown as being directly derived from the terminal of one of the coils, while the remaining terminal of the coil is connected by the conductor 1 through regulating coils $E'$, $E^2$ to a conductor 2 leading to the terminal $d^2$. In this manner the current flowing to the work-circuit is caused to traverse the coils $E'$, $E^2$. Alternating currents flowing through these coils tend to generate lines of magnetic force flowing in the direction indicated by the arrows $x'$, $x^2$ that is to say through the soft-iron spokes $e'$, $e^2$, upon which the coils are wound, and complete their circuits through the corresponding spokes $f'$, $f^2$. The number of these lines of force will vary directly with the current flowing to the work circuit, that is to say they will vary with the work being done. The poles of the armature are further provided with armature-coils G which are wound in the same general manner as the coils C and have their terminals $h'$, $h^2$ connected with commutator plates $H'$, $H^2$, in such a manner that continuous currents will be taken off by the brushes $k'$, $k^2$ (see Fig. 2). The connections of one terminal of these coils, however, is through the regulating coils $F'$, $F^2$. These latter coils surround the spokes $f'$, $f^2$ already referred to, and the lines of force developed by the currents in the coils $E'$, $E^2$ therefore thread the coils $F'$, $F^2$. If now a given amount of work is being done in the work-circuit, a given current will flow through the coils $E'$, $E^2$ and a given number of lines of force will thus be generated which thread the coils $f'$, $f^2$ and thus develop therein an electromotive force which owing to the direction of the winding and the connection of the coils will be added to the electromotive force due to the revolution of the coils G in the field of force. An increase in the amount of current flowing to the work-circuit from the coils C will tend to develop additional lines of force in the core, and this will tend to stem back the lines of force developed in the field-magnet, thus reducing the electromotive force of the coils C, but the additional current flowing to the work-circuit causes a sufficient increase in the number of lines of force threading the coils $F'$, $F^2$ to add to the field-excitation sufficiently to maintain the electromotive force upon the work-circuit constant or approximately so. By varying the number of turns in the coils $F'$, $F^2$ or $E'$, $E^2$ or both, the potential of the machine may be caused to rise under an increase of load or it may be caused to decrease in a certain ratio, if such effect should be desired. In some instances the lines of force developed by the current flowing through the coils $F'$, $F^2$ may exceed in value those developed by the coils $E'$, $E^2$, in which case the former may be regarded as exerting a controlling influence over the electromotive force of the current delivered through the work-circuit, by adding to or taking from the number of lines of force threading the coils $E'$, $E^2$.

We claim as our invention—

In a self-exciting alternating current electric machine, the combination of an armature core having supporting spokes, main armature coils wound upon the core, supplemental armature coils, regulating coils connected in series with the main armature coils and wound upon the said spokes regulating coils connected in series with the supplemental coils and wound upon the said spokes and a conductor through which the connections are made from the supplemental coils, with the field exciting coils, substantially as described.

In testimony whereof we have hereunto subscribed our names this 18th day of February, A. D. 1890.

ALBERT SCHMID.
BENJAMIN G. LAMME.

Witnesses:
J. M. TATE, Jr.,
J. W. SMITH.